Jan. 27, 1931.  G. CRESPI  1,790,368
CONTINUOUS PRODUCTION PRESS FOR THE ALIMENTARY
PASTE INDUSTRY AND SIMILAR INDUSTRIES
Filed Jan. 6, 1930  2 Sheets-Sheet 1

INVENTOR
Giovanni Crespi
by
Attorney

Jan. 27, 1931.  G. CRESPI  1,790,368
CONTINUOUS PRODUCTION PRESS FOR THE ALIMENTARY
PASTE INDUSTRY AND SIMILAR INDUSTRIES
Filed Jan. 6, 1930   2 Sheets-Sheet 2
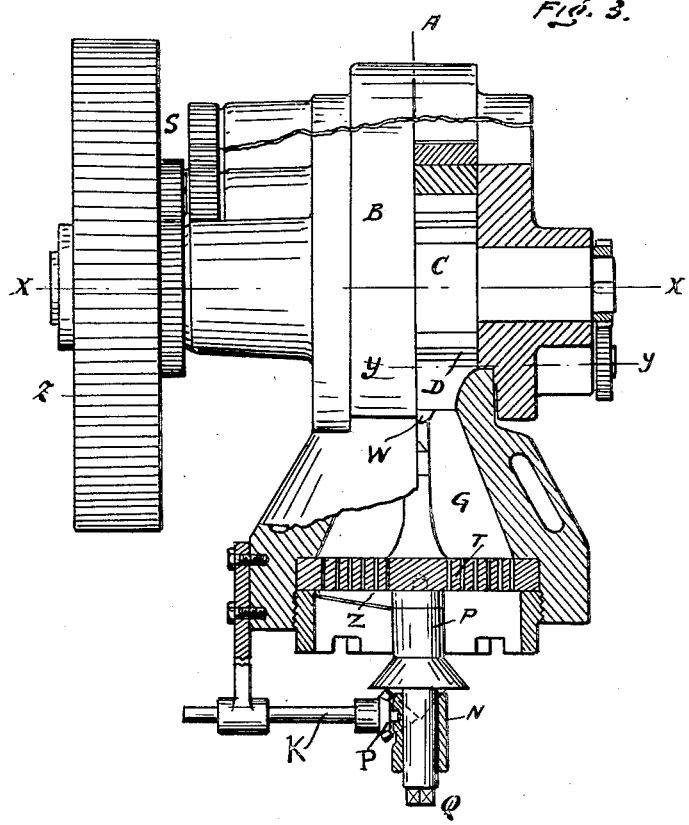
Fig. 3.
INVENTOR
Giovanni Crespi
by 
Attorney Patented Jan. 27, 1931

1,790,368

UNITED STATES PATENT OFFICE

GIOVANNI CRESPI, OF MILAN, ITALY

CONTINUOUS PRODUCTION PRESS FOR THE ALIMENTARY PASTE INDUSTRY AND SIMILAR INDUSTRIES

Application filed January 6, 1930, Serial No. 418,858, and in Italy February 15, 1929.

The main object of the present invention is an improvement in the continuous production presses for the alimentary paste and similar industries, characterized by the special form of the two drums or rolls which receive the pasty mass that must be passed through a drawing plate, and exert a convenient pressure upon it in a hollow space provided in front of the said drawing plate, so as to obtain a continuous issue of the paste therethrough. Secondary objects of the invention are special means to feed the pasty mass to said drums or rolls and a peculiar arrangement for supporting and replacing the drawing plate.

Figure 1 in the accompanying drawing shows the press according to the invention in cross section.

Figure 3 is a side elevation, partly in section.

Referring to the said figures, the pasty mass or dough to be passed through the usual drawing plate is fed in at A, and a set of feeding cylinders R1, R2, ... R5, R6 force it into —b—, inside of a hollow casing B. For this purpose the cylinders are so designed that they roll the dough to a sheet gradually decreasing in thickness from A to —b—. The cylinders are driven by gears S at a convenient speed suiting the varying thickness and width of the dough sheet and in such a manner as to tend to effect a back flow of paste or on the contrary to exert a call and a pulling action on it.

In the cylindrical recess formed in the casing B, a drum or roll C revolves about its axis X—X. This drum C is driven by a toothed wheel Z and is fitted with four fixed radial blades $E_1$, $E_2$, $E_3$, $E_4$, sliding along the whole length of the arc f—f—f of the cylindrical recess provided for the drum C in the casing B.

Figure 1:
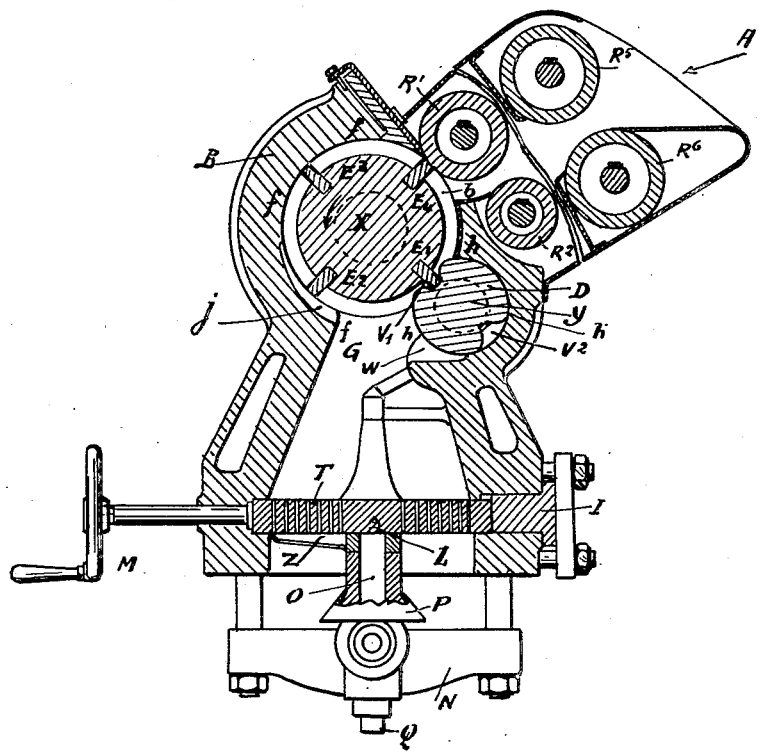

The dough sheet is caused by the cylinder R1 and by the drum C to wind itself about this latter, and is dragged by the radial blades E1, E2, E3, E4 along the arc f—f—f down to the hollow space G above the drawing plate T. Sideways of the hollow space G, the second drum D is arranged in a special recess of the casing B. In Figure 1 this drum D is driven at a convenient speed by external gears, whereas in Figure 2 it runs loose about its axis y—y and is periodically entrained by each of the blades E1, E2, E3, E4 in succession. The drum D forces the dough sheet to detach itself from the cylinder C and it also acts as a scraper as in the case of Figure 2 by means of ridges —u—. This drum D lets the fixed blades E1 ... E4 pass, being provided with 2 grooves or gaps V1, V2 ... the profile of which matches, or approximately matches, the profile of the said blades. The drum D fits exactly the concave cylindrical surface of the corresponding recess of the body B along the whole length of an arc h—h—h, thus ensuring tightness so that the dough continually arriving to the hollow space G is compressed therein and, when the required pressure is attained, is forced to issue in a continuous manner through the perforations of the drawing plate T.

Eventual thin foils and small scraps of dough sliding laterally of and along the arcs —f— and —h— owing to small manufacturing tolerances or to wear are carried towards the hollow space G by the rotation of the drums C and D. Grooves j and W may be provided in the body B in order to effect a preliminary compression of the dough and thus compensate for the small discontinuities that would set in if the gap between two blades E2—E3 or a gap $V_1$—$V_2$ is not filled with dough. Inasmuch as a compression of the dough between two blades E2—E3 and a filling of one gap $V_1$—$V_2$ would take place in the time intervening between the passage of one blade E and the passage of the next blade E, and V2 would be emptied when the corresponding tooth E enters it, thus securing a good continuity.

Figure 2:
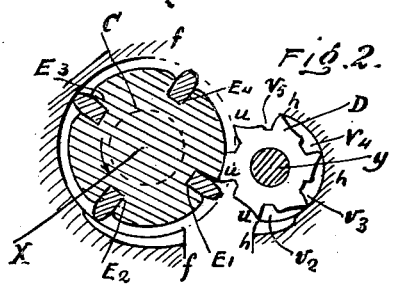
Figure 2 shows a modification of the two rotating drums.

In the particular case represented in Figure 1, the diameter of the drum C is equal or approximately equal to the diameter of the pitch circle of the blades E1, E2, E3, E4; this holds good also in the case represented in Figure 2, in which a certain scraping action is aimed at by means of the ridges —u—.

The drawing plate T may be easily removed or replaced, after removing of a plug I, by pushing it sideways by means of a screw with hand wheel M. Usually in presses for food pastes of the continuous type a device is provided for cutting small lengths of the paste issuing from the drawing plate T. According to the invention this cutting is done by a rotary knife Z having its vertical hub rotating beneath the lower plane of the drawing plate, about a pivot O, and being operated by means of a small horizontal shaft K and a pair of bevel gears P as shown in Figs. 1 and 3. The pivot O is provided with a projection L normally engaging a corresponding recess pierced at the centre of the drawing plate T, in order to lock this latter in the proper relative position with respect to the knife Z. This pivot O is screwed in the cross member N and is provided at its lower end with a square Q to permit that the projection L releases the drawing plate T when that square is turned with a crank (not shown).

Having now particularly described and ascertained the nature of my said invention and in what manner the same is to be performed, I declare that what I claim is:—

1. A continuous production press for drawing alimentary pastes comprising a main rotary drum provided with radially projecting fixed blades, a rotary feeding cylinder coacting with the main drum to wind strips of paste upon the periphery of the main drum between the successive blades thereof, a second rotary drum provided with grooves to allow the said blades to pass said second drum and cooperating with the main drum successively to detach the strips of paste from the main drum and permit the same to be deposited in a compression chamber in the lower portion of which is a drawing plate.

2. A continuous production press for drawing alimentary pastes comprising a main rotary drum provided with radially projecting fixed blades, a plurality of pairs of cylinders one of which coacts with the main drum to wind strips of paste upon the periphery of the main drum between the successive blades thereof, a second rotary drum provided with grooves to allow the said blades to pass said second drum and cooperating with the main drum successively to detach the strips of paste from the main drum and permit the same to be deposited in a compression chamber in the lower portion of which is a drawing plate.

3. Continuous production press according to claim 1 wherein the second mentioned drum is provided with scraping edges alternating with the aforesaid grooves.

4. Continuous production press according to claim 1 having a slot in the wall of the compression chamber, means for normally closing said slot, said means being removable and a screw and crank for moving said drawing plate through said slot.

Signed at Milan (Italy), this 16th day of Dec., 1929.

GIOVANNI CRESPI.